United States Patent Office 3,132,450
Patented May 12, 1964

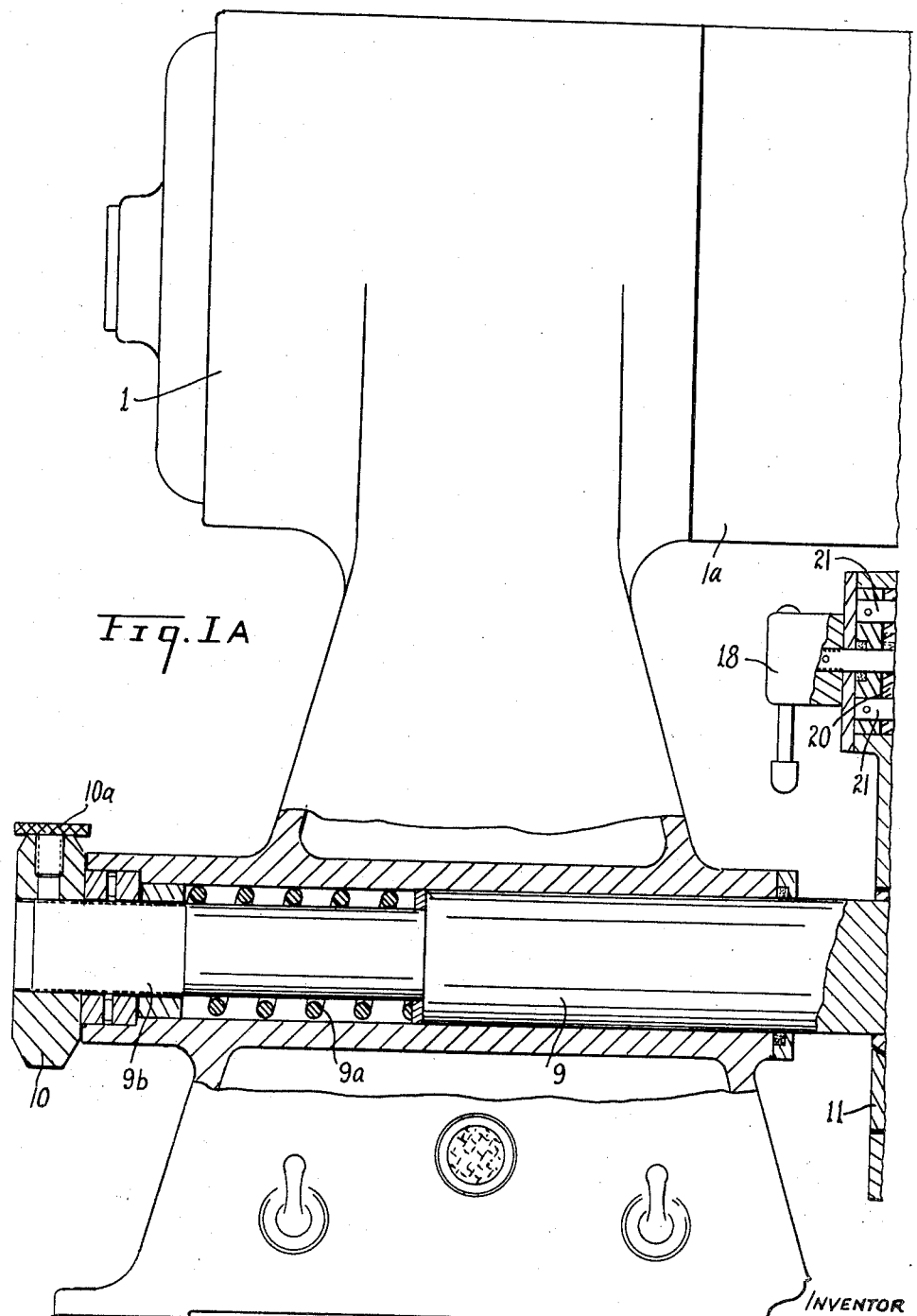

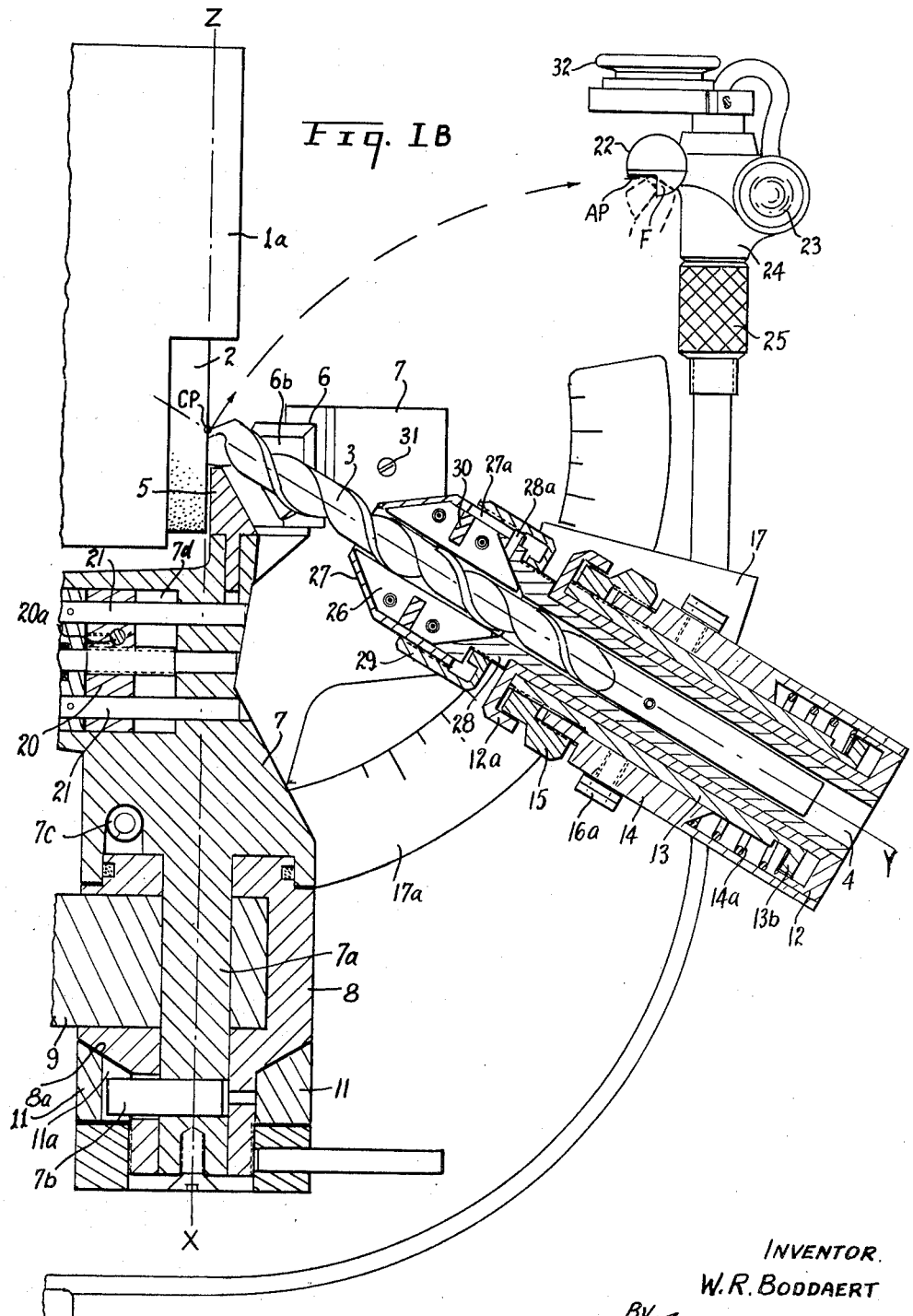

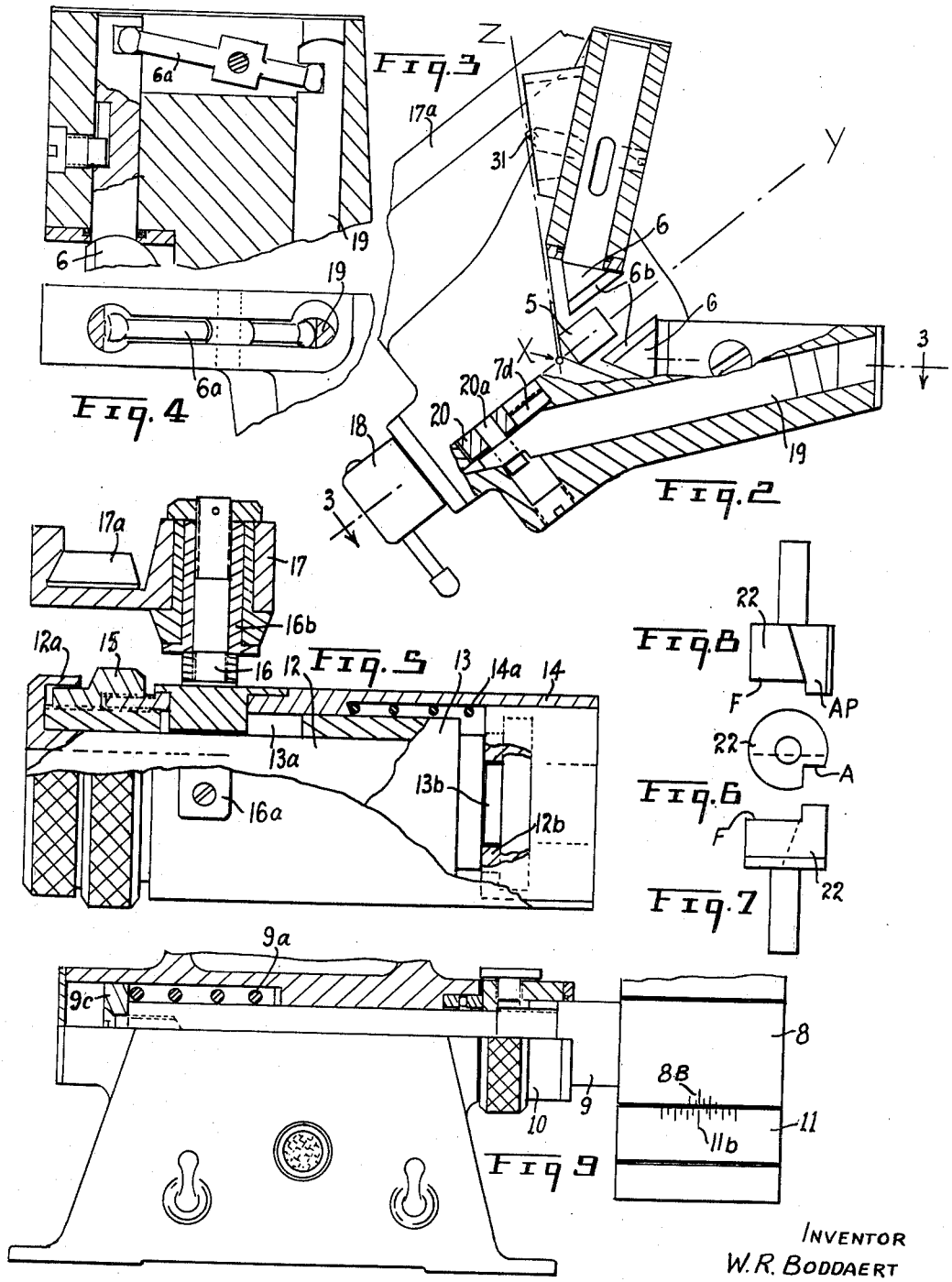

3,132,450
MACHINES FOR GRINDING THE POINTS OF DRILLS
Willem Reinbrandt Boddaert, Cliftonville, Margate, Kent, England, assignor to Edward Patrick Boddaert, Montreal, Quebec, Canada, and Robert David Keith Boddaert, Scarborough, Ontario, Canada
Filed Nov. 9, 1961, Ser. No. 151,238
Claims priority, application Great Britain Nov. 25, 1960
10 Claims. (Cl. 51—125)

This invention relates to machines for grinding the points of drills.

It is an object of the invention to provide an improved such machine which enables drills to be correctly and easily ground with a perfect concentric point having equal cutting angles, and two pairs of corresponding facets.

According to the present invention there is provided a machine for grinding the points of drills comprising a rotatable grinding wheel having a grinding face, a pivot block adapted to rotate about an axis disposed in the plane containing the grinding face, and means for adjusting the position of the pivot block so that its axis can be arranged in the plane containing the grinding face, a centering vice mounted in the pivot block and having jaws movable to grip the land of a drill during a grinding operation, a chuck adapted to receive a drill to be sharpened and to grip the drill by the lands thereof, the said chuck being carried by the pivot block, means for rotating the chuck about the axis of a drill contained therein, means for adjusting the position of the chuck longitudinally of the axis of the drill contained therein without altering the relative positions of the axis of the pivot block and the plane containing the grinding face, a drill setting finger with which a drill held in the chuck can be engaged to determine the position of the drill in the chuck in relation to the grinding face and means permanently mounted on the pivot block for trimming the grinding face, the means being adjustable ito the said plane whereby as a result of a trimming operation the axis of the pivot block is automatically retained in the plane containing the grinding face.

For convenience of description, the axis about which the pivot block can rotate is herein referred to as the axis X, the longitudinal axis of the drill to be sharpened is referred to as the axis Y and the plane containing the grinding face of the grinding wheel is referred to as plane Z. The machine of the present invention is capable of fulfilling three conditions, namely (i) When a drill is correctly fitted in the machine, the axis Y will at all times intersect the axis X whatever the diameter of the drill or the angle at which it is positioned.

(ii) The axis X will lie within the plane Z and the position of the axis X can be adjusted to take account of wear of the grinding face without altering the relationship between X and Y.

(iii) The drill can be moved axially without disturbing the position of X or Z with respect to Y, or X with respect to Z.

In the accompanying drawings:
FIGURES 1A and 1B are side elevation, partly in section, of a grinding machine according to the invention.
FIGURE 2 is a detail plan view partly in section of the centering vice of the machine, shown in FIG. 1.
FIGURE 3 is a partial elevation looking in the direction of the arrows 3—3 in FIG. 2.
FIGURE 4 is a horizontal section on the line 4—4 of FIG. 3.
FIGURE 5 is a detailed plan view of the chuck holder shown in FIG. 1.
FIGURE 6 illustrates a drill setting finger,
FIGURE 7 is a top plan view of the setting finger shown in FIG. 6.
FIGURE 8 is a bottom plan view of the setting finger shown in FIG. 6.
FIGURE 9 is a fragmentary view illustrating a modification of the machine illustrated in FIG. 1.

The drill grinding machine illustrated in the drawings comprises a frame or housing 1 (FIG. 1) which contains an electric motor 1A adapted to rotate a cup-shaped grinding wheel 2 about a horizontal axis. A drill 3 to be ground is carried in a chuck 4 with its working end projecting from the chuck and supported on a drill rest 5 and is centered by the jaws 6 of the centering vice located in pivot block 7, which is rotatable about axis X of a pin 7A located in a nut 8 mounted on a shaft 9 which has an external screw thread. An adjusting wheel 10 is rotatable on the screw thread 9B to move the shaft and the pivot block 7 backwards or forwards so that the axis X can be brought into or maintained within the plane Z containing the face of the grinding wheel 2. A set screw 10A is provided to lock the adjusting wheel 10 on the shaft 9. Thus the shaft 9, nut 8 and block 7 can be rocked as a unit on the linear axis of the shaft 9 and the block 7 can be turned on the axis X without, in either case, disturbing the pre-arranged position of the axis X in respect to the plane Z or the axis Y in respect to X.

A stop (not shown) inside the frame 1 limits rocking movement of the shaft 9 to 40°, but this stop can be by-passed by moving the pivot block 7 away from the grinding wheel face by means of adjusting wheel 10. This restricted movement prevents the point of the drill 3 being moved beyond the vertical centre line of the grinding wheel 2, thereby avoiding unnecessary labour, and at the same time provides a suitable stop for inspection and recharging the drill chuck when bringing the block 7 away from the wheel 2. By moving the block 7 away from the grinding face of the wheel 2 and by-passing the stop, e.g. to permit of changing wheels whose grinding face position with respect to the axis might be different, it is made impossible for an operator when returning block 7 to its grinding position to run into the grinding wheel 2, and damage the jaws 6.

Turning of the pivot block 7 is restricted by a stop 7B, which controls both the backing-off and cutting angles. The backing-off angle is fixed at 30° and is controlled by stop 7B which engages in a slot 8A in nut 8 both for right and left handed drills. The cutting angle however can be varied from 0°–30° by an adjustable nut 11 having a recess 11A. The stop 7B abuts against the sides of the recess 11A which can be preset through 30–25–20–15–12½–10–7½–5–2½–0–5–7½–10–12½–15–20–25–30 degrees 11B marked on nut 11 against fixed index markings of 6–3–0–3–6 degrees 8B marked on the nut 8 thus providing a vernier of ½° for most angles and of 1° for all angles, for either right or left handed drills.

Pivot block 7 is loaded by a tension spring 7C one end of which is fixed to a pin (not shown) on nut 8, the other end being secured in the block 7. The shaft 9 is doubly spring-loaded, a compression spring 9A serving to keep pivot block 7 in the required X—Z position and a tension spring (not shown) being fitted between a small bar in shaft 9 and the bottom of the frame 1 for steadying the unitary rocking movement of the shaft, nut and pivot vice combination.

For machines with a web-thinning attachment, the means for adjusting the axis X of the pivot block 7 in relation to the plane Z can be modified as illustrated in FIG. 9. The adjusting wheel 10 and locking screw 10A are in this modification disposed intermediate the ends of the shaft 9 which terminates in a screw-on guide washer 9C and a coil compression spring 9A bears between this washer and a shoulder in the frame 1; the whole is enclosed by a cover plate.

The chuck 4 is secured in sleeve 12 (FIG. 5) which is slidable and rotatable in a sliding sleeve 13. The sliding sleeve 13 rides inside a holder 14 on a keyway 13A and can be moved axially in either direction by turning a nut 15. This movement being limited so that no accidents can occur through over running. The holder 14 is supported in a gimbal 16A by a pivot pin 16 on a slide 17 which rides on a bracket 17a on which is marked an index scale of the correct penetrating angles for different materials so that the position of slide 17 on the bracket 17A will describe the resultant penetrating angle of the drill point. The bracket 17A is attached to the pivot block 7 parallel to axis X. In order to ensure that the linear axis Y of the drill 3, when inserted in the chuck 4, will lie in the plane X—Y when the latter is positioned at 90° in relation to Z and when the point of the drill is placed on the drill rest 5 and the centering jaws 6 are closed by a rotating screw 18, the pivot pin 16 can be adjusted by a threaded bush 16B, the brush and the pivot pin being locked after adjustment. The sleeve 12 can be rotated inside the sliding sleeve 13 by easing forward a nut 12A to disengage interlocking lugs 12B and 13B of the sleeves 12, 13 then turning the nut 12A (see FIG. 5). A spring 14A will automatically re-lock the lugs 12B and 13B when movement through 180° is completed.

During grinding, the drill 3 is held by its land by the centering jaws 6, which run on keys to prevent them from turning, at one quarter spiral turn. However, as the distance between the point of a drill 3 and a point a quarter of a spiral turn therefrom varies according to the diameter of the drill it is essential that the jaws 6 move away from the plane Z as larger drills are inserted or more than one vice would be required. The centering jaws 6 are therefore placed at angles of 40° with respect to the axis Y and can be moved backwards and forwards by levers 6A (FIG. 2) which are activated by two push-pull rods 19 (FIG. 2) riding on the protruding ends of a pin 20A fixed in a slide 20 which can be moved backwards and forwards along two supports 21 in a slot 7D by rotating a screw 18. The faces 6B of the jaws 6 which grip the lands of the drill 3 are ground in situ so that a very high accuracy can be obtained in their relation to axis X. Owing to this accuracy, the axis Y of a drill, no matter what its diameter or at what angle it is placed in relation to X or the plane Z, is made to cut the axis X of the pivot block 7, while any movement backwards or forwards along or turning around Y will in no way interfere or alter the relative positions of X—Z, X—Y or Y—Z.

A drill 3 to be ground is placed on the drill rest 5 at the base of the cone of the drill and it is obvious that the point of the drill, and therefore the position of the linear axis Y of the drill, will rise in relation to the drill rest 5 as the diameter of the drill increases or the penetrating angle decreases. Consequently, the distance between the pivoting point of pin 16 and the point CP at which the linear axis of the drill contacts the grinding face of the wheel 2 will also increase with larger diameter drills, but if the axis X is maintained in the plane Z, the resulting point obtained after grinding the cutting angles, no matter at what degree they or the penetrating angles are set, will at all times lie in plane Z.

It must be appreciated that with all drills the cutting edges of the flutes lie slightly outside the line drawn through the centre of the web, the amount varying with the size of the drills. Thus if axis X is placed in front of plane Z and a drill point is taken across the grinding face of the wheel 2 with plane X—Y at an angle of 30° to form the clearance angle, incidently this facet so cut will be at 60° in relation to the linear axis of the drill but will give a 6° lip clearance angle, and when the pivot is moved so that the plane X—Y is for example at an angle of 13° in relation to plane Z and the drill is taken back across the cutting face of the wheel, a second facet will be cut one edge of which will form the cutting edge of one of the flutes, it will be found that owing to the position of axis X too little will have been removed from the drill point and if repeated on the other side of the drill point the two lines formed by the facets will not meet. On the other hand, if axis X is placed beyond plane Z the opposite will happen and the lines will overlap. Only when axis X is situated in plane Z will the lines coincide on the linear axis of the drill no matter whether the drill is aligned correctly or not. However, to obtain a perfect cutting drill point it is essential that the demarcation lines between each set of facets of the drill point are parallel to the cutting edges of the flutes of the drill and meet on the linear axis Y of the drill. In order to set the drill 3 in the correct position in the chuck 4, a drill setting finger 22 (FIG. 6) and an inspection lamp 23, arranged to throw a shadow on the facets of the drill point when the drill and the lamp have appropriate relative positions, are mounted on a slide 24. The cutting edge of one of the flutes is placed against a flat F which is parallel to the plane X—Y, while the point of the drill is made to abut against the bottom of the finger 22 at AP so that when the drill point is placed on the rest 5 and the land of the drill is gripped between the centering jaws 6, the cutting edges of the flutes will lie parallel but just outside the plane X—Y while the point of the drill will lie just a fraction beyond plane Z and it is this amount that will be accurately removed during grinding so long as axis X is situated in Z. The amount to be removed can be increased if required by turning the nut 15 without disturbing the relation between Z—X—Y. As the distance between the pivoting point of pin 16 and the contact point CP of the linear axis of the drill on the grinding face alters according to the diameter and the penetrating angle of the drill so of course must the distance between the pivoting point and the face AP of the setting finger 22 be correspondingly altered. Such adjustments can be effected by moving the setting finger 22 to the required distance by turning a screw 25. Thus, drills of the same diameter can be batch ground without altering the setting of the machine as long as the same cutting and penetrating angles are required.

The chuck 4 is not removed for the insertion of drills, but is fixed in sleeve 12. The chuck has four jaws 26 to enable drills to be gripped firmly and accurately along the lands, the length of the jaws being more than one complete spiral turn of the largest drill for which the chuck is intended, and which meets the requirements for the range of the machine. The chuck has a nose 27 which slides up and down on a shank 28. A pin 28A rides in a slot 27A in the nose so that the nose cannot rotate. A nut 29 can rotate and has right and left handed threads corresponding with the left and right hand threads on the nose 27 and shank 28 respectively. The four chuck jaws 26 are spring loaded and move on a ring 30. When the nut 29 screws down the nose 27, it forces the four jaws 26 to contract along the cones and slide inwards along the ring 30. The ring 30 ensures equal and co-ordinated movement of the jaws and further serves to hold the jaws 26 together as a unit in case they need to be removed from the chuck.

By this construction, the jaws 26 grip the lands of the drill without turning or twisting it and keep the cutting edge of the flute in position against finger 22, without requiring any strain or effort by the operator.

While grinding, the grinding face of the wheel 2 will wear away but by turning the wheel 10, the position of X can be adjusted to keep it within plane Z. However, the grinding face will also require trimming from time to time and for this purpose a diamond trimmer 31 (FIG. 2) is provided on the pivot block 7. It is adjustable within the block 7 and, when "set" the point of the diamond will be brought into plane Z by turning the block 7 counter-clockwise through 30°. The axis X is already in plane Z, so that if wheel 10 is turned to bring the pivot block 7 closer to the grinding wheel face this can be trimmed while at the same time the axis X is maintained within the resulting plane Z. As a result of the trimming operation, the axis of the pivot block is automatically retained in the plane containing the grinding face. The only means the operator has to verify that X lies in Z is by looking at the drill point through his magnifying glass and making sure that the dividing ridges, formed by the respective facets and which appear like lines, meet. No other means are available and it is this method which is used in "setting" the machine, in other words a drill is inserted and ground; the lines do not meet; the pivot is now adjusted by turning nut 10 while the drill point is being ground until the lines do meet, e.g. X lies now in Z. The pivot is now moved 1 or 2 thousandths of an inch nearer to the grinding face, the point then ground will show the two lines overlapping

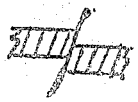

which means that X lies beyond Z. The diamond trimmer is now adjusted and the drill point ground again, this time while the wheel is being trimmed, this operation is repeated until the adjustment of the trimmer has removed enough of the grinding face so that it is on a level with X and thus X lies in plane Z and the proof of this is that the "lines" on the drill point meet. The trimmer is now locked in this position and, until the diamond's edge wears which takes a very long time, no adjustment or interchanges are needed.

An inspection lens 32 is provided adjacent the setting finger 22 to assist in setting a drill in the chuck.

What I claim is:

1. A machine for grinding the points of drills comprising a rotatable grinding wheel having a grinding face, a pivot block adapted to rotate about an axis disposed in the plane containing the grinding face, means for adjusting the position of the pivot block so that its axis can be arranged in the plane containing the grinding face, a centering vice mounted in the pivot block and having jaws movable to grip the land of a drill during a grinding operation, a chuck adapted to receive a drill to be sharpened and to grip the drill by the lands, the said chuck being carried by the pivot block, the linear axis of the said drill, when the point of the drill is placed between the jaws of said centering vice, falls in a plane in which the axis of the said pivot block is located, means for rotating the chuck about the axis of a drill contained therein, means for adjusting the position of the chuck longitudinally of the axis of the drill contained therein without altering the relative positions of the axis of the pivot block and the plane containing the grinding face, a drill setting finger with which a drill held in the chuck can be engaged to determine the position of the drill in the chuck and means permanently mounted on the pivot block for trimming the grinding face, the said means being adjustable into the said plane whereby, as a result of a trimming operation, the axis of the pivot block is automatically retained in the plane containing the grinding face.

2. A machine as claimed in claim 1 wherein stops are provided for controlling rotation of the pivot block on its axis to control the backing-off and cutting angles of the drill, an adjustable nut and index markings being provided to permit the cutting angle to be adjusted.

3. A machine as claimed in claim 1 wherein the chuck is mounted in a first sleeve arranged in a second sleeve slidable in a holder pivotally mounted on a slide movable on a bracket secured to the pivot block, the said first sleeve being also rotatable about the axis of a drill in the chuck.

4. A machine as claimed in claim 3 wherein the bracket is provided with markings of different penetrating angles, to enable the slide to be positioned in accordance with a desired penetrating angle.

5. A machine as claimed in claim 1 wherein the jaws of the centering device are movable on keys towards or away from the drill in the chuck and, a rotatable screw acting through a slide on push-pull and lever rods move the jaws as desired.

6. A machine as claimed in claim 1 wherein a trimmer is adjustably positioned with respect to the grinding face and is adapted to trim the grinding face during a grinding operation.

7. A machine as claimed in claim 1 wherein the said pivot block is rotatably mounted on a nut, and a shaft located on an axis at right angles to the axis of rotation of the pivot block, is movable axially to move said pivot block with respect to the plane of the grinding face of the grinding wheel.

8. A machine as claimed in claim 7 in which the said shaft has a threaded portion and an adjusting wheel on the threaded portion of the shaft controls the axial position of said shaft and the said pivot block.

9. A machine as claimed in claim 1 in which the said chuck and drill are movable in a vertical plane to locate the point of the drill adjacent to an inspection lamp the light rays from which are directed at right angles to the axis of the drill to throw a shadow on the facets of the drill point, to delineate the dividing lines between the facets.

10. A machine as set forth in claim 9 in which the drill setting in the chuck is controlled by a setting finger located adjacent the said inspection lamp and an inspection lens is located above the said setting finger.

References Cited in the file of this patent

UNITED STATES PATENTS

| | | |
|---|---|---|
| 1,524,672 | Rabut | Feb. 3, 1925 |
| 2,133,414 | Bahuaud | Oct. 18, 1938 |
| 2,245,858 | Hornberger | June 17, 1941 |
| 2,471,443 | Munro | May 31, 1949 |
| 2,524,279 | Van Wyk | Oct. 3, 1950 |
| 2,663,126 | Amiet | Dec. 22, 1953 |
| 2,866,302 | Amiet | Dec. 30, 1958 |
| 2,932,135 | Tatar | Apr. 12, 1960 |

FOREIGN PATENTS

| | | |
|---|---|---|
| 1,063,367 | France | Dec. 16, 1953 |
| 1,114,627 | France | Dec. 19, 1955 |
| 1,138,018 | France | Jan. 21, 1957 |
| 334,042 | Switzerland | Dec. 31, 1958 |